Figure 1:
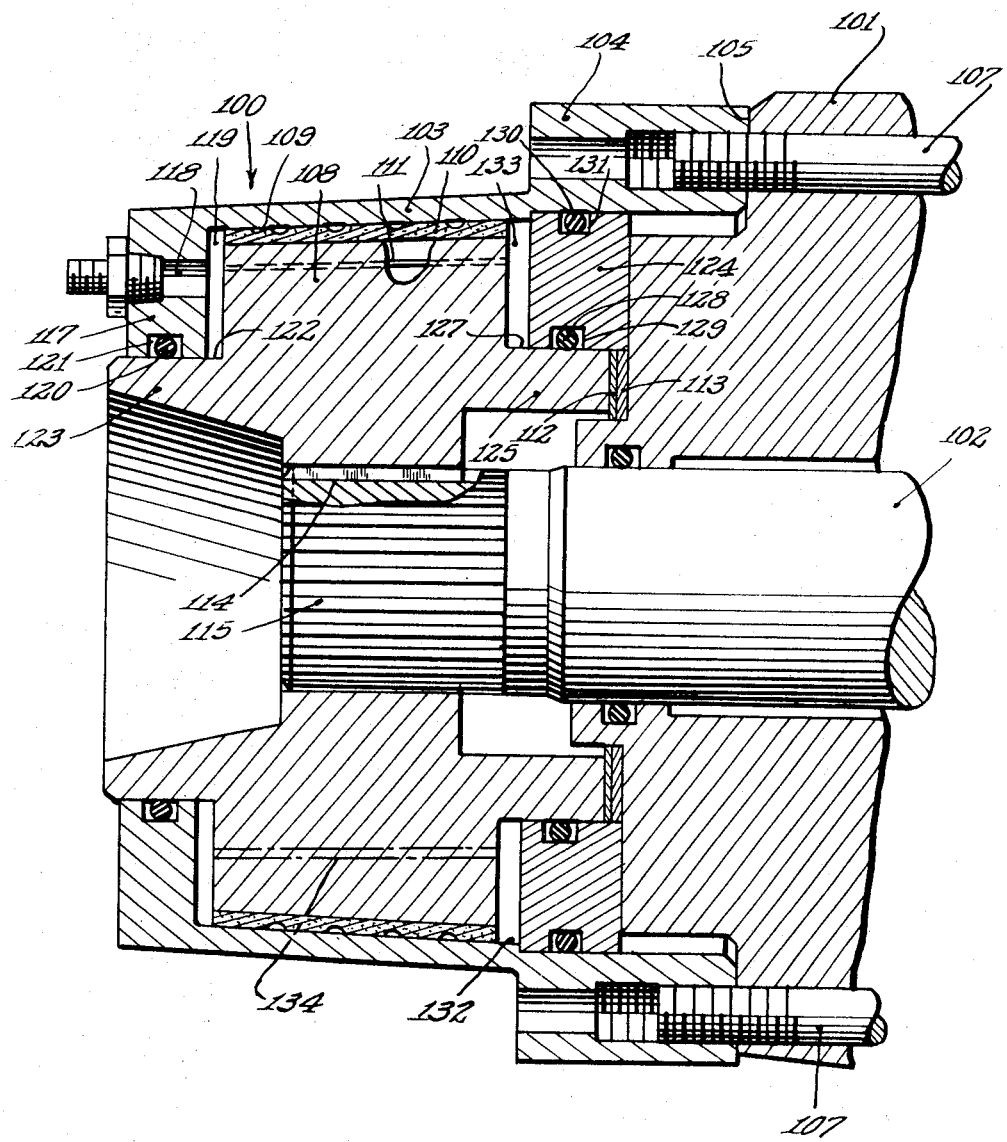

United States Patent

[11] 3,586,136

| | | |
|---|---|---|
| [72] | Inventor | Gordon W. Kamman<br>Buffalo, N.Y. |
| [21] | Appl. No. | 857,426 |
| [22] | Filed | Sept. 12, 1969 |
| [45] | Patented | June 22, 1971 |
| [73] | Assignee | Houdaille Industries, Inc.<br>Buffalo, N.Y. |

[54] HYDRAULICALLY RELEASABLE LOCKING BRAKES FOR ROTARY DEVICES
10 Claims, 2 Drawing Figs.

[52] U.S. Cl. ................................ 188/170,
188/74, 188/152
[51] Int. Cl. .................................. F16d 65/24
[50] Field of Search .......................... 188/67, 74,
110, 152.86, 170

[56] References Cited
UNITED STATES PATENTS
3,150,571  9/1964  Frassetto et al ............... 188/67 X
3,353,455  11/1967  Berry ........................... 188/170 X
3,466,947  9/1969  Smith ........................... 188/170 X Primary Examiner—Duane A. Reger
Attorney—Hill, Sherman, Meroni, Gross & Simpson ABSTRACT: Hydraulically releasable locking brakes for rotary devices include a brake drum for attachment rigidly to a body which journals a shaft having a portion projecting therefrom and on which is corotatively mounted an annular brakeshoe, the shoe and drum having complementary normally lockingly engaged frustoconical braking surfaces of largest diameter near the body, with the braking surface of the shoe comprising high friction brake material bonded to the shoe. The brakeshoe is normally thrust axially to effect locking frictional engagement of the braking surfaces. Rotary seals are provided at substantially smaller diameter opposite end portions of the brakeshoe than the braking surface diameter and free from increased clearances when the drum is expanded by hydraulic unlocking pressure.

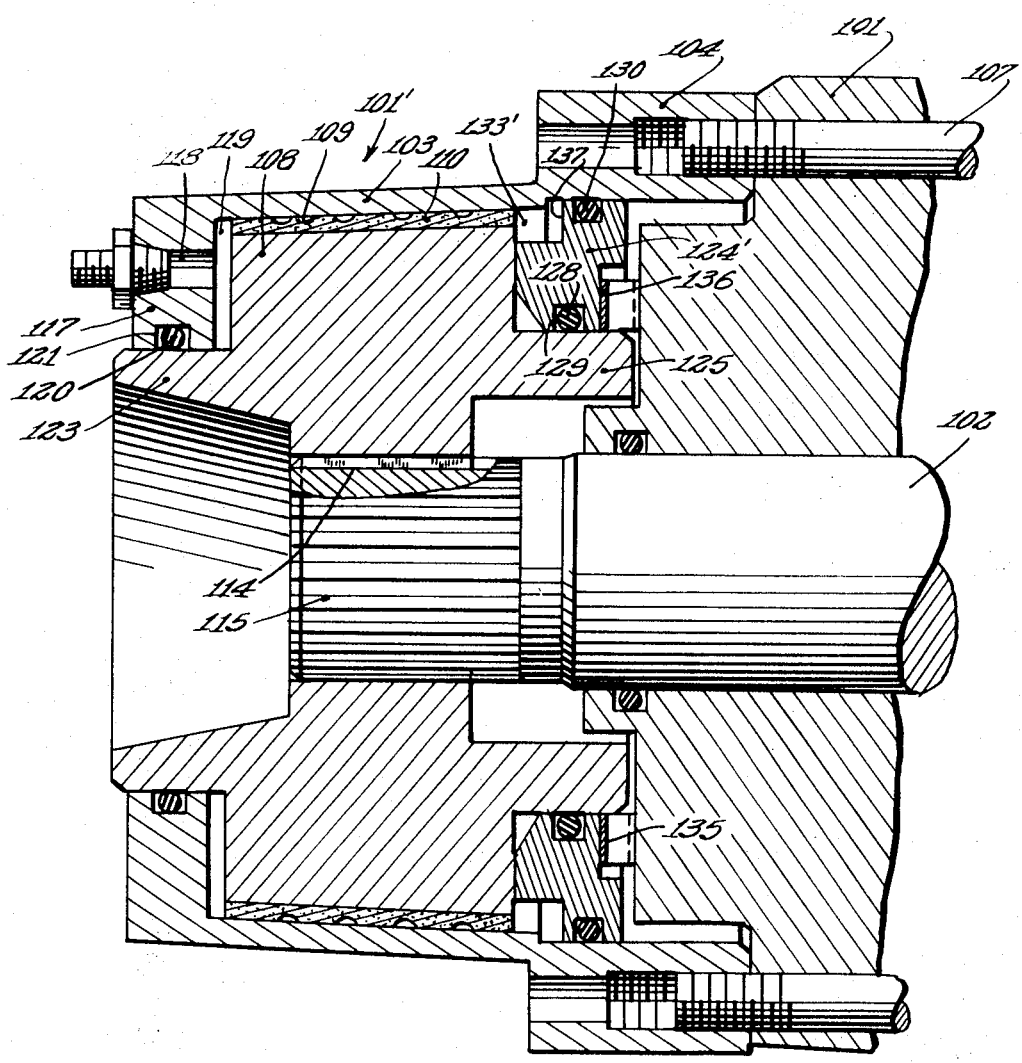

HYDRAULICALLY RELEASABLE LOCKING BRAKES FOR ROTARY DEVICES

This invention relates to improvements in hydraulically releasable locking brakes for rotary devices, such as motors, rotary actuators, and other rotary devices in which a body and a shaft must be held for at least some intervals of time against relative rotation and with a fail-safe positiveness.

Hydraulically releasable interference fit surface holding arrangements are known, as for example, between a sleeve and a shaft. However, this requires an inordinately long area of shaft and interference fit sleeve to attain reasonably high static holding torque.

Various more compact arrangements including brake drum and shoe structures have been disclosed in Rumsey and Perhack, U.S. Pat. No. 3,379,100, issued Apr. 23, 1968.

It is a principal aim of the present invention to provide a substantially improved, more rugged, simplified, lower cost, highly versatile and efficient hydraulically releasable locking brake of the shaft carried brakeshoe and shaft-journaling body carried brakedrum-type.

To this end, an important object of the invention is to provide a new and improved hydraulically releasable locking brake which normally operates with high static holding torque but has only low dynamic drag when released.

Another object of the invention is to provide a hydraulically releasable locking brake of the shaft carried brakeshoe and shaft-journaling body carried brakedrum-type having simple and efficient means for maintaining braking grip of the brakeshoe and the brakedrum.

A further object of the invention is to provide a new and improved arrangement for efficient hydraulic unlocking of the brake without subjecting dynamic seals of the assembly to increase clearances when the brakedrum is hydraulically expanded.

Still another object of the invention is to provide a hydraulically releasable brake of the character indicated having substantially longer seal life, less seal drag and elimination of end load during hydraulic brake release.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a longitudinal sectional view through a brake structure embodying features of the invention mounted on a rotary device; and FIG. 2 is a longitudinal sectional view through a modified form of the brake, also showing the same mounted on a rotary device.

In one embodiment of the invention as depicted in FIG. 1, a hydraulically releasable locking brake 100 is adapted for mounting on a rotary device such as a rotary hydraulic actuator comprising a rugged body 101 journaling a shaft 102. Either the body 101 or the shaft 102, but most generally the body is adapted to be fixed with relation to a supporting structure (not shown), while the shaft may be attached to a member or device to be actuated thereby as required but which must be held quite firmly against movement relative to the body 101 during nonoperating intervals or normally when not operated. The brake 100 holds the shaft positively stationary relative to the housing during the nonoperating periods.

In the arrangement shown, the brake 100 embodies features of high preloaded torque efficiency, effective hydraulic release capability, nonexpanding seal areas so that the seals at either side of the hydraulic releasing pressure areas may be of minimum diameter and by reason of freedom from expansion in the seal areas less frictional seal drag, maximum seal life, maximum holding power, and substantial freedom from end load. To this end, the brake comprises a brakedrum 103 having means on one end portion thereof in the form of a flange 104 of a diameter to engage against an axially facing shoulder 105 adjacent to the outer diameter of the body 101 and against which the flange is fixedly secured as by means of bolts 107. Relatively rotatable within the drum 103 is a brakeshoe 108 of substantial length and having a frustoconical perimeter complementary to a frustoconical braking surface 109 on the inside of the brakedrum tapering from a larger diameter at the attachment flange end of the brakedrum toward a smaller diameter at the opposite end portion of the drum. For improved braking grip, the braking surface of the brakeshoe is provided over its entire length and circumference with high friction brake material 110 bonded thereto in desirably 3 or 4 segments which are preferably reasonably close-jointed as represented at 111.

Preloading of the brakeshoe 108 to maintain normal axially outward locking braking thrust of the braking surface 110 thereof against the braking surface 109 of the brake drum is desirably effected by an end thrust relationship between the confronting ends of the housing 101 and the brakeshoe 108 such that the desired thrust reaction is accomplished by drawing the drum attachment flange 104 toward and desirably into seating engagement with the shoulder 105 by means of the bolts 107. Adjustment of the torque resistance thrust load can be readily effected to meet various requirements by interposing one or more shim spacer ring discs 112 between the confronting ends of the housing and brakeshoe with at least one of the spacers comprising a thrust bearing 113, conveniently a polytetrafluoroethylene coated metal disc. Through this arrangement, the shaft 102 is adapted to be held stationary relative to the housing body 101 by means of a keyed connection between the shaft and the brakeshoe 108, efficiently accomplished by reception within an axial splined bore 114 in the shoe of a complementary splined end portion 115 of the shaft. This splined connection of the shaft with the brakeshoe also permits relative axial adjustment movements of the shaft and shoe.

When it is desired to release the shaft 102 for relative rotation in the housing 101, the brake drum 103 is hydraulically expanded to release the, in effect, interference fit between it and the brakeshoe 108. For this purpose, that portion of the brake drum which confronts the gripping perimeter of the brakeshoe, and at least a a short distance beyond the opposite ends of the brakeshoe is of a substantially uniform wall thickness which has the requisite burst strength to enable the necessary expansion within safe elastic limits. While at the base end of the brakedrum the attachment flange 104 provides a relatively rigid and inexpansible base ring, a radially inwardly extending annular flange structure 117 of substantial length and width provides a rigid inexpansible collar on the outer or head end of the brakedrum, thereby assuring normal braking grip of the drum on the brakeshoe, but enabling hydraulic pressure brake release. In this instance, hydraulic pressure for selectively separating the braking surfaces is arranged to be introduced through a port 118 in the collar flange 117 with distribution of the fluid uniformly to the braking surfaces by way of a narrow annular chamber 119 between the confronting faces of the collar 117 and the adjacent end of the brakeshoe.

Leakage of hydraulic pressure fluid from the chamber 119 is prevented by a dynamic seal 120 between the collar flange 117 and the brakeshoe so favorably located that it is not affected by brakedrum expansion nor by relative axial movements of the brakeshoe and brakedrum, is of as small a diameter as practical, is highly efficient with minimum seal drag under conditions of its use and of extended useful life. These ends are attained by having the seal 120 in the form of a high-pressure sealing ring mounting in a suitable annular groove 121 within a cylindrical inner edge surface on the collar flange 117 in close slidable confronting relation about a cylindrical radially facing bearing surface 122 on a stepped outer end portion 123 of the brakeshoe 108. As will be observed, the bearing surface 122 is of substantially smaller diameter than the minimum diameter of the braking surface of the brakeshoe, enables free relative axial adjustment of the brakeshoe and brakedrum, and affords maximum width section of the collar flange 117 to resist any expansion clearance between the bearing surface 122 and the collar flange during brake-releasing pressurization of the brake. This avoids any necessity for overloading the seal 120 and thus increasing seal drag as would be necessary if the sealed joint were subject to expansion incident to pressurization, which is entirely eliminated in the present instance by the relatively isolated relationship of the sealed joint and the pressure expansible area of the brakedrum.

At the opposite or inner end of the brake assembly, sealing against pressurization leakage is effected under favorable sealing conditions similar to those prevailing in respect to the outer end dynamic seal 120. For convenience in assembly and mounting of the brake, an inner end cover ring and seal adapter mount 124 of substantial length and diameter for rigidity, complementary to the outer end collar flange 117, is mounted in close outer perimeter engagement within the annular mounting flange 104 and in close slidable inner perimeter engagement about an inner end axially inwardly extending stepped annular base extension flange 125 on the brakeshoe 108 providing a cylindrical bearing surface 127 on its outer perimeter within the ring 124. Sealing of the joint between the bearing surface 127 and the ring 124 is effected by means of a dynamic sealing ring 128 mounted in a seal groove 129 in the inner perimeter of the mounting ring while a static sealing ring 130 mounted in a seal groove 131 in the outer perimeter of the member 124 seals the joint with the flange 104. Substantial axial immobility of the seal mounting ring 124, maintaining it seated on or at least close to the confronting end of the housing 101 is assured by means of a generally axially inwardly facing shoulder 132 on the brakedrum member confronting the adjacent axially o adjacent axially outer corner of the ring member. It will be observed that all of the desirable attributes of the mounting and relationship of the dynamic seal 120 are equally relevant to the dynamic seal 128.

An advantage gained form introduction of the hydraulic pressure fluid into the outer end chamber 119 is that an instantaneous opposite axial reaction under the pressure occurs between the brakeshoe 108 and the head flange 117 tending to back the brakeshoe axially inwardly from its engagement with the brakedrum, with the inner end portion 125 of the brakeshoe thrusting toward the bearing 113. Then as the brakedrum 103 expands to release its braking surface 109 from the friction brake surfacing 110 of the brakeshoe, there is displacement of some of the hydraulic pressure fluid into a relatively narrow clearance chamber 133 between the inner end of the brake shoe and the ring member 124 and from which leakage is prevented by the sealing rings 128 and 130. An at least equal surface area relationship of the opposite ends of the brakeshoe 108 expose brakeshoe 108 exposed to the end chambers 119 and 133 avoids development of any axially outward pressure on the brakeshoe which might tend to diminish brake-releasing effect of the hydraulic pressure. Preferably at least a slight differential in surface area of the exposed brakeshoe ends is provided for wherein the outer end surface is of larger area than the inner end surface whereby during pressurization the thrust is axially inward tending to relieve the braking engagement of the shoe with respect to the brakedrum. This is especially valuable where in a large brake mounted with the brake directed downwardly, there might be a gravitational thrust of the brakeshoe toward the outer end and which would be counteracted by the greater area of exposure of the outer end of the brakeshoe to the hydraulic pressure. Such differential area relationship is readily effected by having the diameter of the bearing surface 127 sufficiently greater than the bearing surface 122 not only to compensate for the larger diameter of the braking surface of the brakeshoe at the inner end as compared to the outer end, but also to establish the lower differential area of exposure of the inner end as compared to the outer end.

Upon releasing the hydraulic pressure from the brake, the brakedrum resumes its grip upon the brake shoe. Where the joint or joints 111 between the friction brake-surfacing material sections 110 are quite close, or entirely absent, the hydraulic pressure trapped in the rear end chamber 133 will tend to increase the braking grip by thrusting the brakeshoe 108 into the braking surface 109 of the drum. Where there is one or more joints 111 there may be leakage forwardly from the chamber 133 into the chamber 119 at a rate dependent upon the closeness of the joint. On the other hand, if supplemental braking thrust of pressure trapped in the chamber 133 is not desired, a communication bore 134 may be provided longitudinally through the brakeshoe 108 between the chambers 119 and 133. Such a bore is not needed, of course, where it is practical to have the joint 111 of sufficient clearance to effect the desired communication between the chambers.

In the modification of FIG. 2 a brake 101' is provided which in general respects is the same as the brake 100, and common reference numerals indicate similar elements for which the description is identical with the description of those elements in respect to FIG. 1. In the brake 101', however, instead of the brakeshoe 108 thrusting against the end of the housing 101 through a thrust-bearing arrangement to maintain a normal axially outward bias of the brakeshoe into the braking surface 109 of the brakedrum, it is spring biased for output control or brake gripping torque resistance. To this end an annular heavy-duty wave spring 135 is normally under biasing compression between the contiguous end of the housing 101 and the inner end cover and seal-mounting ring member 124' which is in this instance provided with a rabbet rear end seating groove 136 in which the spring is seated. At its forward end, the ring member 124' thrusts under spring pressure against the inner end of the shoe 108, with a front end radially outer marginal rabbet groove 137 communicating with the interface area of the shoe and drum to receive hydraulic pressure fluid during brake release pressurization, whereby to back off the ring member 124' as permitted by a limited clearance between its inner end and the adjacent face of the housing 101 and relieve the brakeshoe of the spring bias. Upon release of the hydraulic pressure for resetting the brake, the spring 135 through the ring 124' thrusts the brake shoe 108 into the brakedrum cone surface 109 with constant takeup thrust compensating for any wear. In this instance, both of the sealing rings 128 and 130 are of dynamic type in view of the axial movement involved in the ring member 124', as well as the relative rotary movement involved between the ring member and the rearward extension 125 of the brakeshoe. During pressurization, a gap relationship between the ring member 124' and the brakeshoe is effected whereby to release the axially facing confronting surfaces of the brakeshoe and the ring member from any frictional engagement so that the shoe may run as free as practicable with the rotary shaft 102. This may be effected by having the ring member 124' slightly shorter than the rearward shoe extension 125 so that axially inward movement of the shoe 108 during brake releasing pressurization the shoe will stop and permit the ring member 124' to back off slightly and fully open the chamber 133' whereupon a substantially balanced pressure relationship prevails on the opposite axial ends of the shoe 108 which for this purpose are desirably of equal area. Upon release of the hydraulic pressure, the biasing spring 135 thrusts the ring member 124' and the shoe 108 into the brakedrum surface 109 which resumes its brake-holding grip.

I claim as my invention:

1. In a hydraulically releasable locking brake for a rotary device having a body journaling a shaft for relative rotary movement of the shaft and body and with a portion of the shaft projecting from the body:

a brakedrum having means on one end portion thereof for attaching it rigidly to the body concentrically about said shaft end portion;

an annular hydraulically expansible braking surface of substantial length on said drum;

an annular brakeshoe including means for mounting it corotatively on said shaft portion and having a braking surface of substantial width complementary to and normally frictionally lockingly engaged by said drum-braking surface to hold the shoe and the shaft against rotation relative to the body;

means for selectively hydraulically separating said braking surfaces to enable relative rotation of said shaft and body;

an outer end stepped portion on said shoe providing a radially facing bearing surface of substantially smaller diameter than said braking surfaces;

an inexpansible outer end flange structure on said drum rotatably encircling said bearing surface and enclosing a hydraulic pressure fluid chamber; and a dynamic seal preventing leakage between said bearing surface and said flange structure from said chamber.

2. A locking brake according to claim 1, said means for selectively hydraulically separating said braking surfaces including a hydraulic pressure fluid delivery port in said flange structure.

3. A locking brake according to claim 1, including an inner end stepped portion on said shoe providing a radially facing bearing surface of substantially smaller diameter than said braking surfaces, an inexpansible structure encircling said inner end stepped portion bearing surface relatively rotatably and enclosing a hydraulic pressure fluid chamber, and a dynamic seal preventing leakage between said inner end portion bearing surface and the encircling structure.

4. A locking brake according to claim 3, said braking surfaces being frustoconical and tapering from a larger diameter at the inner ends thereof toward the outer ends thereof; said brakeshoe having a respective oppositely axially facing end surfaces in said chambers, and the inner end axially facing surface being of smaller area than the outer end surface whereby to afford an axially inward thrust on the brakeshoe during hydraulic separating of the brake surfaces and wherein said chambers are also pressurized.

5. A locking brake according to claim 3, both of said chambers receiving hydraulic pressure fluid during hydraulic separation of said braking surfaces, and said brakeshoe having respective oppositely axially facing surfaces in said chamber of substantially equal area for substantial freedom from axial thrust during pressurization.

6. A locking brake according to claim 3, said inexpansible outer end flange structure having a hydraulic fluid delivery port comprising part of said means for selectively hydraulically separating said braking surfaces discharging into said first-mentioned chamber, said brakedrum carrying friction material on its braking surface providing relief communication between said chambers.

7. A locking brake according to claim 3, including pressure equalizing and relief passage means effecting communication between said chambers.

8. A locking brake according to claim 3, including an end thrust bearing structure between said inner end stepped portion on the brakeshoe and said body.

9. A locking brake according to claim 3, said inexpansible structure encircling said inner end portion bearing surface comprising a ring secured substantially axially immovably relative to said body and said means on the brakedrum for attaching it to said body and including a static seal between the ring and said means for attaching.

10. A locking brake according to claim 3, said braking surfaces being frustoconical and tapering from a larger diameter at said one end portion toward smaller diameter at the opposite end portion of the drum, said structure rotatably encircling said inner portion on the shoe comprising a reciprocable thrust ring, and biasing spring means normally thrusting said ring into thrusting engagement with said shoe to drive the shoe into said drum, and said means for selectively hydraulically separating said braking surfaces at the same time acting upon the brakeshoe in opposition to the bias of said spring.